United States Patent [19]

Zaitsu

[11] Patent Number: 4,545,668
[45] Date of Patent: Oct. 8, 1985

[54] IMAGE FORMING APPARATUS

[75] Inventor: Hirohachi Zaitsu, Yokohama, Japan

[73] Assignee: Tokyo Shibaura Denki Kabushiki Kaisha, Kawasaki, Japan

[21] Appl. No.: 529,744

[22] Filed: Sep. 6, 1983

[30] Foreign Application Priority Data

Sep. 6, 1982 [JP] Japan .................. 57-154807

[51] Int. Cl.⁴ .......................................... G03G 21/00
[52] U.S. Cl. .................. 355/3 R; 355/3 SH; 355/14 SH
[58] Field of Search ............. 355/3 R, 3 SH, 14 R, 355/14 SH, 133; D16/27–32

[56] References Cited

U.S. PATENT DOCUMENTS

| | | | |
|---|---|---|---|
| 3,997,262 | 12/1976 | Doi et al. | 355/11 |
| 4,403,851 | 9/1983 | Yanagawa | 355/14 R |
| 4,416,536 | 11/1983 | Itoh et al. | 355/14 R |
| 4,462,677 | 7/1984 | Onoda | 355/3 R |

FOREIGN PATENT DOCUMENTS 2307402  8/1973  Fed. Rep. of Germany .

Primary Examiner—A. T. Grimley
Assistant Examiner—C. Romano
Attorney, Agent, or Firm—Cushman, Darby & Cushman

[57] ABSTRACT

An electronic copying machine of the shell-type with a main body having an upper unit and a lower unit. The upper unit is provided with an original tray on which originals to be copied after being automatically fed to an exposure table are disposed. The upper unit is connected to the lower unit by a connecting part, in such a way that the upper unit can be swung by a predetermined angle in relation to the lower unit. The original tray is slanted, with its front end being made lower than its back end, to thereby form an elevation angle equal to or larger than the predetermined angle, in relation to the horizontal face. Even if the upper unit is swung by the predetermined angle, in relation to the lower unit, to expose the inside of the copying machine when a paper jamming trouble occurs the original tray is not slanted until its back end is made lower than the horizontal face, thus preventing the originals from sliding down from the back end of said original tray.

8 Claims, 2 Drawing Figures

IMAGE FORMING APPARATUS

BACKGROUND OF THE INVENTION

The present invention relates to an image-forming apparatus of the shell type whose main body comprises a first unit and a second unit which are separable from each other.

Conventional image forming apparatuses or electronic copying machines of the shell type have a main body comprising an upper or first unit provided with an original tray, and a lower or second unit; which units are separable from each other in such a way that the first unit is swung in relation to the second unit, to facilitate the correction of paper jams.

Electronic copying machines of this type, however, have a drawback in that originals stacked on the original tray may be dropped from the back of the slanted original tray, when the first unit is swung in relation to the second unit to solve the paper jamming trouble.

SUMMARY OF THE INVENTION

Thus, an object of the present invention is to provide an image forming apparatus capable of preventing originals from dropping from an original tray on which the originals are disposed, when a first unit provided with the original tray is lifted and swung in relation to a second unit.

According to the present invention, an image forming apparatus is provided which comprises a main body having a first unit and a second unit which units are separable from each other; connecting means for connecting the first and second units to each other in such a way that the first unit is swingable by a predetermined angle, in relation to the second unit; and disposing means having a disposing face on which sheets to be fed the first unit is disposed, attached to the first unit, and when the first unit is closed to the second unit the disposing face is slanted by an elevation angle equal to or larger than the above-predetermined angle and in a direction which is the reverse of that in which the first unit is swung in relation to the second unit.

DETAILED DESCRIPTION OF THE PREFERRED EMBODIMENT

An embodiment of the present invention may now be described in detail, with reference to FIGS. 1 and 2.

Figure 1:
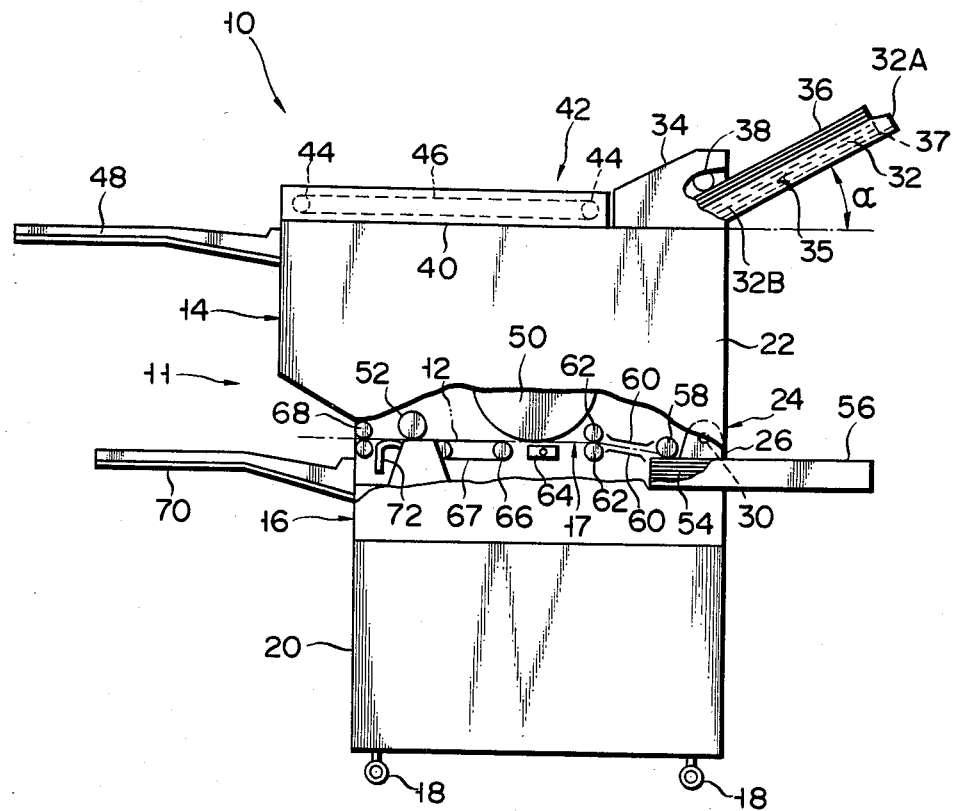
FIG. 1 is a partially sectional front view showing, is closing condition, an electronic copying machine according to an embodiment of the present invention.

As shown in FIG. 1, an electronic copying machine 10 has a main body 11 which serves to perform a copying function and which is separated along a separating face 12 (shown by dot-and-dash line) into an upper unit (first unit) 14 and a lower unit (second unit) 16, said separating face 12 extending substantially in the center of the main body 11, as shown by the dot-and-dash line of FIG. 1. The upper unit 14 and the lower unit 16 are covered, as a single unit, by a cover 22, which is detachable from these units and whose lower end is rotatably supported by hinges (not shown) attached to the lower end of said lower unit 16.

The separating face 12 corresponds substantially to a passage 17 on which sheets of copying paper are fed.

The upper and lower units 14 and 16 are connected to each other by a connecting part (connecting means) 24 at one end of the separating face 12. The connecting part 24 limits the movement of the upper unit 14 in such a way that the upper unit 14 is swung by a predetermined angle $\beta$, about 30° in this case, relative to the separating face 12. The connecting part 24 comprises a supporting or projecting portion 28 provided with a hole 26 extending through the lower unit 16 from its front side to its back side, and a shaft 30 extending from front and back sides of the upper unit 14 through the hole 26 at that end of the upper unit 14 which is adjacent to the separating face 12, and rotatably supported by the hole 26. The lower unit 16 is provided with a stopper section 33 which serves to limit the swinging movement of the upper unit 14 in such a way that an edge 31 of the upper unit 14 is brought into contact with the stopper section 33 when the upper unit 14 is swung to the predetermined angle $\beta$, about 30° in this case, around the shaft 30.

An original tray (disposing means) 32 on which originals to be copied are stacked is attached to an originals-separating section 34 of the upper unit 14, at angle $\alpha$ which is formed by a disposing face 37 and the horizontal face. This angle $\alpha$ is, when the upper unit 14 is closed to the second unit, equal to or larger than angle $\beta$ (about 30°) and is about 35° in this case. Thus, even when the upper unit 14 is swung by this angle $\beta$, the back end 32A of the original tray 32 or the upper end of the upwardly-slanted original tray on which originals are stacked will not be lower than the horizontal face. Since the original tray 32 is slanted with its front end 32B made lower than its back end 32A, and the originals stacked on the original tray 32 thus move to the originals-separating section 34 by their own weight.

Guide plates 35 are projected from both sides of the original tray 32, in that direction in which the originals are stacked and in the direction in which the originals are fed, in such a way as to guide the originals.

The front end 32B of the original tray 32 is attached to the originals-separating section 34 where the originals 36 fed from the original tray 32 are separated one by one.

The originals-separating section 34 is provided with an originals-separating roller 38 for separating the originals 36 stacked on the original tray 32 one by one. An originals-feeding means 42 is arranged adjacent to the originals-separating section 34 to carry the originals fed from the originals-separating section 34 to an exposure table 40. The originals-feeding means 42 has rollers 44 positioned on both sides thereof and a conveyor belt 46 stretched between the rollers 44. An originals-receiving tray 48 for receiving the originals after they have been copied is arranged in that direction in which the originals are carried by the originals-feeding means 42.

The upper unit 14 houses, along the separating face 12, a photosensitive drum 50 and a fixing means 52 for fixing toner onto a sheet of copying paper.

A cassette 56 which contains copying papers 54 is set into the lower unit 16 adjacent to the separating face 12. A pick-up roller 58 is located adjacent to the cassette 56 to pick up a copying paper 54 from those contained in the cassette 56. The copying paper 54 picked up by the pick-up roller 58 is guided by guide plates 60 and guide rollers 62 to the photosensitive drum 50 along the separating face 12. The lower unit 16 is provided with a transfer means 64 located opposite to the photosensitive drum 50 with the separating face 12 interposed therebetween, said transfer means 64 serving to transfer the toner on the drum 50 to the copying paper 54. Adjacent to the transfer means 64 and in the copying papers-feeding direction are arranged rollers 66 and a conveyor belt 67 for further conveying the transferred copying paper 54 along the separating face 12. The final end of the copying papers-feeding direction along the separating face 12 is provided with papers-discharging rollers 68 for discharging the copying papers 54 conveyed. Adjacent to the papers-discharging rollers 68 is arranged a copying papers-receiving tray 70 to receive the papers discharged by the discharging rollers 68. A handle 72 for lifting the upper unit 14 is arranged between the discharging rollers 68 and the fixing means 52 and on the front side of the upper unit 14. This handle 72 also serves to engage with the lower unit 16, to lock the upper unit 14 when the upper unit 14 is seated on the lower unit 16 and, more specifically, when $\beta=0$. The upper end of the handle 72 is attahced to a frame (not shown) adjacent to the separating face 12, with the other end thereof extending downward to the lower unit 16, to form its handle portion.

Figure 2:
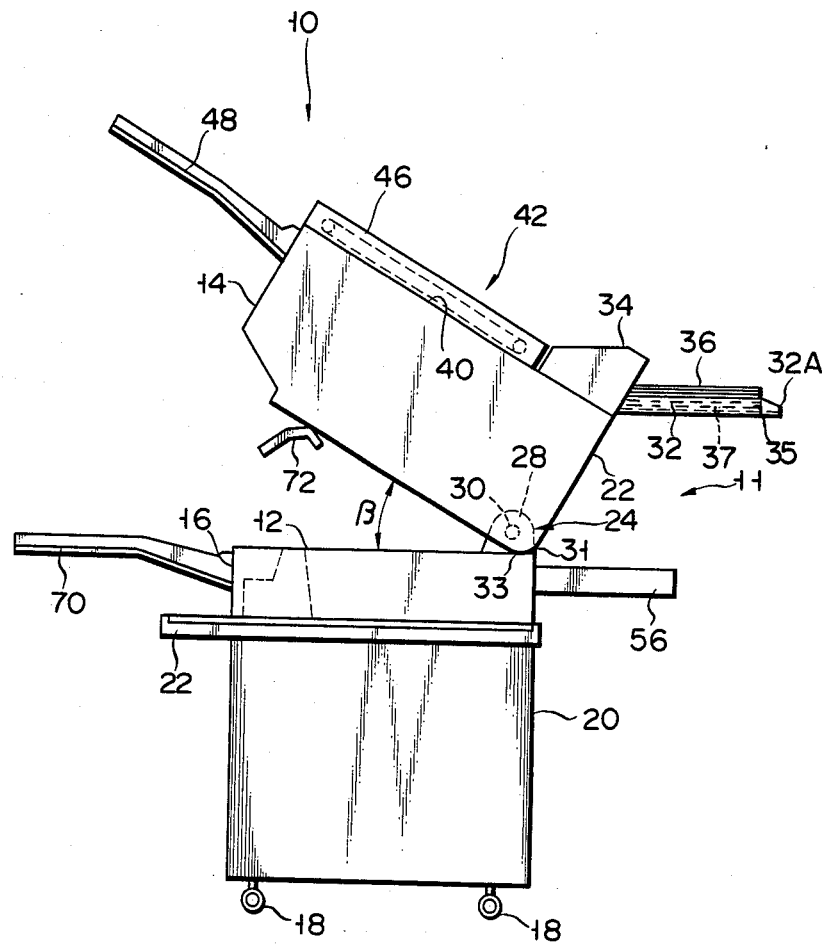
FIG. 2 is a front view showing, in opening condition the electronic copying machine shown in FIG. 1.

Referring to FIG. 2 which is generally showing the upper unit and the lower unit, and in which parts housed in each of the units are omitted, how the above-described embodiment of the present invention is operated may be described.

When paper jamming trouble is caused within the paper-feeding passage, the cover 22 which had covered the upper and lower units 14, 16 as a single unit is uncovered, rotating around the hinges (not shown) fixed to the lower end of the lower unit 16, to thereby expose the upper and lower units 14, 16.

The operator then grasps the handle 72 to lift the upper unit 14. When the upper unit 14 is lifted and swung by the predetermined angle $\beta$ in relation to the lower unit 16 or the separating face 12, about 30° in this case, the projection 28 of the upper unit 14 is brought into contact with the frame of the lower unit 16, so that the swinging movement of the upper unit 14 can be limited. The original tray 32 is slanted this time, with the swinging movement of the upper unit 14, though the originals 36 stacked on the original tray 32 are not allowed to drop from the back end 32A thereof, since the angle $\alpha$ to which the original tray 32 is slanted is equal to or larger than angle $\beta$ that the back end 32A of the original tray 32 is not slanted lower than the horizontal line. More specifically, the back end 32A of the original tray 32 is not slanted downward from the horizontal line, to thereby prevent the originals 36 from dropping from the original tray 32.

After the paper-feeding passage 17 is exposed and the paper jamming trouble is solved thereby, the upper unit 14 is swung back in such a way as to be seated on the lower unit 16, thus making the electronic copying machine 10 ready for the copying operation.

Here, it should be noted that the present invention is not limited to the above-described embodiment, since it can be modified into various embodiments.

Although the present invention has been described by using the electronic copying machine as an example of an image forming apparatus according to the present invention, it can be embodied by a heat transfer printing apparatus, for example, and the same effects attained in the case of the electronic copying machine can also be achieved in the case of the heat transfer printing apparatus.

In the case of the electronic copying machine, the separating face between the upper unit and the lower unit has been formed along the paper-feeding passage, though it may be shifted from the paper-feeding passage.

The angle $\beta$ to which the upper unit can be lifted and swung in relation to the lower unit has been limited in such a manner that the edge of the upper unit is brought into contact with the frame of the lower unit, though the upper and lower units may be connected to each other by a spring, for example, and the relationship between the urging force of said spring and the weight of the upper unit may be used to limit the angle $\beta$. The impact caused at the time of lifting the upper unit can thus be absorbed by the spring.

Although one cassette has been set into the lower unit in the case of the above-described embodiment, two or three cassettes, for example, each containing paper of a size different from those of paper contained into others, may be set into the lower unit. These cassettes may be set, not into the lower unit, but into the upper unit.

The connecting means for connecting the upper and lower units to each other has been located at the separating face or at one end of the paper-feeding passage, though it may be located substantially in the center of the separating face.

What is claimed is:

1. An image forming apparatus, comprising:
    a main body having a first unit and a second unit which are separable from each other;
    connecting means for connecting the first and second units to each other in such a way that the first unit is swingable by a predetermined angle in relation to the second unit; and
    disposing means having a disposing face on which sheets to be fed to the first unit are disposed, attached to the first unit, and said disposing face is slanted by an elevation angle equal to or larger than said predetermined angle, and in a direction which is the reverse of that in which the first unit is swung in relation to the second unit, when the first unit is closed to the second unit.

2. An image forming apparatus according to claim 1, wherein said connecting means includes a shaft provided to the first unit, and a supporting part provided to the second unit to rotatably support the shaft.

3. An image forming apparatus according to claim 2, wherein said connecting means includes a stopper section which is brought into contact with the second unit to define the predetermined angle by which the first unit is swung in relation to the second unit.

4. An image forming apparatus according to claim 1, wherein between said first and second units a passage for feeding sheets of paper is formed and can be easily exposed by swinging the first unit in relation to the second unit when a paper jamming trouble is to be solved.

5. An image forming apparatus according to claim 1, wherein said first unit includes a handle which serves to lock the first unit to the second unit when the first unit is seated on the second unit; whereby, when the handle is lifted to unlock the first unit from the second unit, the first unit can be swung in relation to the second unit, to form the predetermined angle between the first unit and the second unit.

6. An image forming apparatus according to claim 1, wherein said disposing means includes an original tray on which originals are disposed, the first unit includes an exposure table where the originals are exposed, and an originals-feeding device for automatically feeding the originals stacked on the original tray toward the exposure table.

7. An image forming apparatus according to claim 6, wherein said original tray includes guide plates for guiding the orignals in the originals feeding direction, erected from both sides thereof.

8. An image forming apparatus according to claim 1, wherein said main body includes a cover for covering the first and second units as a single unit, and wherein said cover can be uncovered to expose the first and second units.

* * * * *